United States Patent [19]

Turcheck, Jr. et al.

[11] Patent Number: 5,103,304
[45] Date of Patent: Apr. 7, 1992

[54] HIGH-RESOLUTION VISION SYSTEM FOR PART INSPECTION

[75] Inventors: Stanley P. Turcheck, Jr., Homer City, Pa.; Randy K. Baird, Bolivar, Pa.; James P. Martin, Blairsville, Pa.

[73] Assignee: FMC Corporation, Chicago, Ill.

[21] Appl. No.: 583,256

[22] Filed: Sep. 17, 1990

[51] Int. Cl.⁵ .................................. H04N 7/18
[52] U.S. Cl. ........................ 358/101; 358/106
[58] Field of Search .............. 358/101, 106, 107; 382/8

[56] References Cited

U.S. PATENT DOCUMENTS

| | | | |
|---|---|---|---|
| 4,619,356 | 10/1986 | Dean et al. | 198/395 |
| 4,707,734 | 11/1987 | Labinger et al. | 358/106 |
| 4,764,969 | 8/1988 | Ohtombe et al. | 358/106 X |
| 4,799,175 | 1/1989 | Sano et al. | 358/106 X |
| 4,845,558 | 7/1989 | Tsai et al. | 358/106 |
| 4,958,373 | 9/1990 | Usami et al. | 358/106 X |
| 4,959,223 | 9/1990 | Juvinall et al. | 358/106 |

Primary Examiner—Victor R. Kostak
Attorney, Agent, or Firm—L. B. Guernsey; M. Lee

[57] ABSTRACT

A high-resolution vision system for a detailed inspection of parts. A charge coupled device provides high-resolution in both an X and a Y axis. Data from the charge coupled device resulting from a standard part is stored in compact form. Compact data from a part being inspected is compared with the compact data from the standard part to determine if the tested part is good or not.

3 Claims, 5 Drawing Sheets

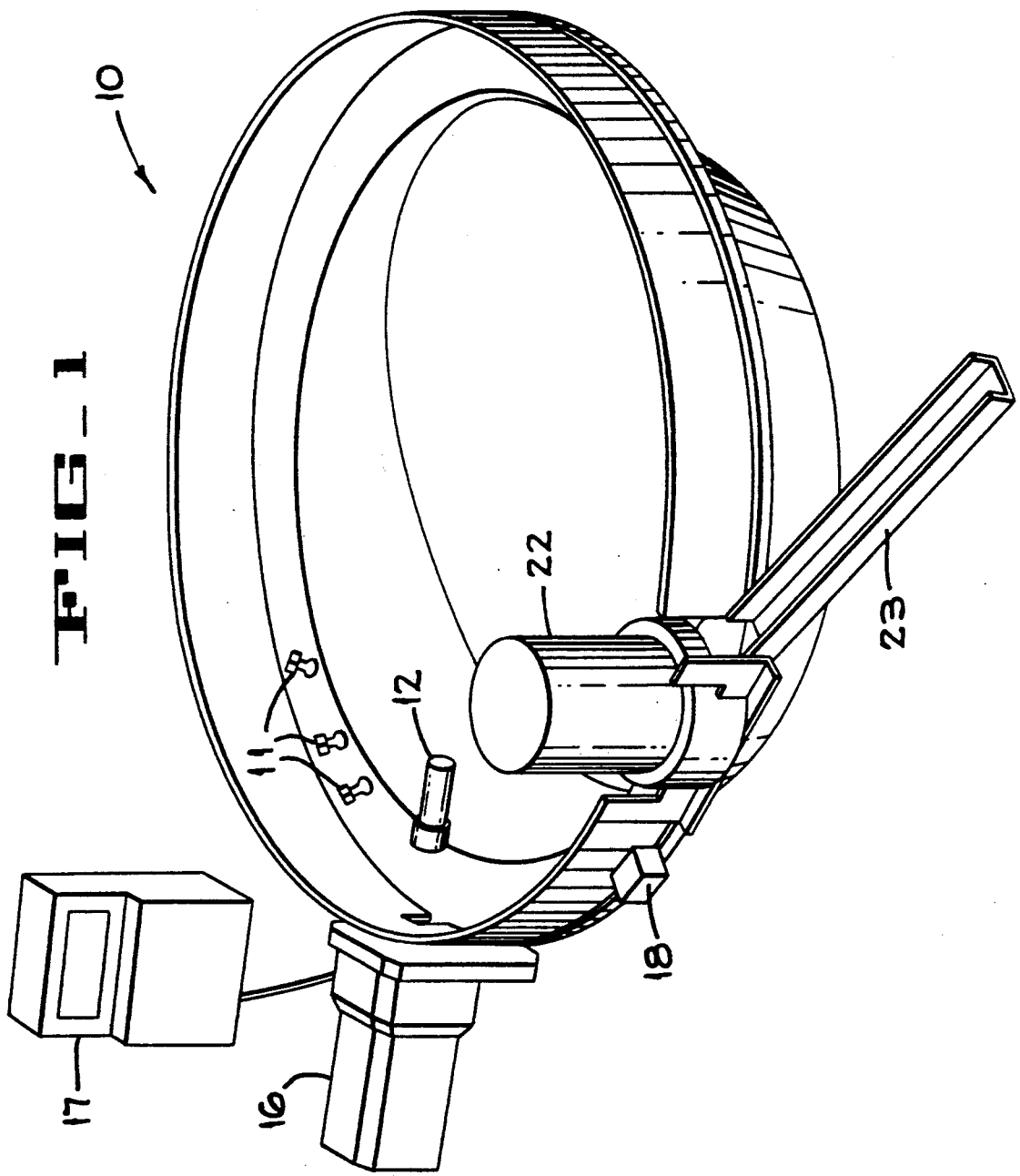
FIG_1

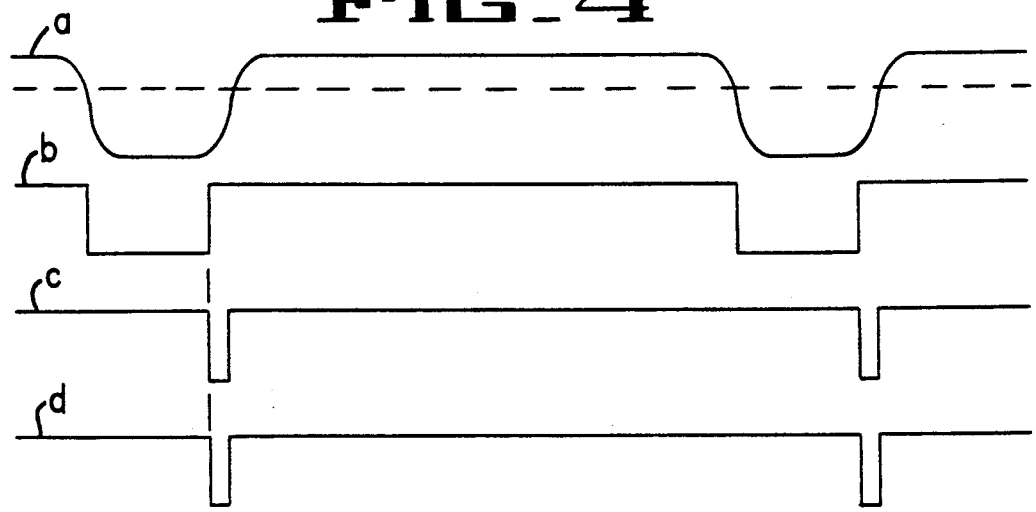
FIG_4
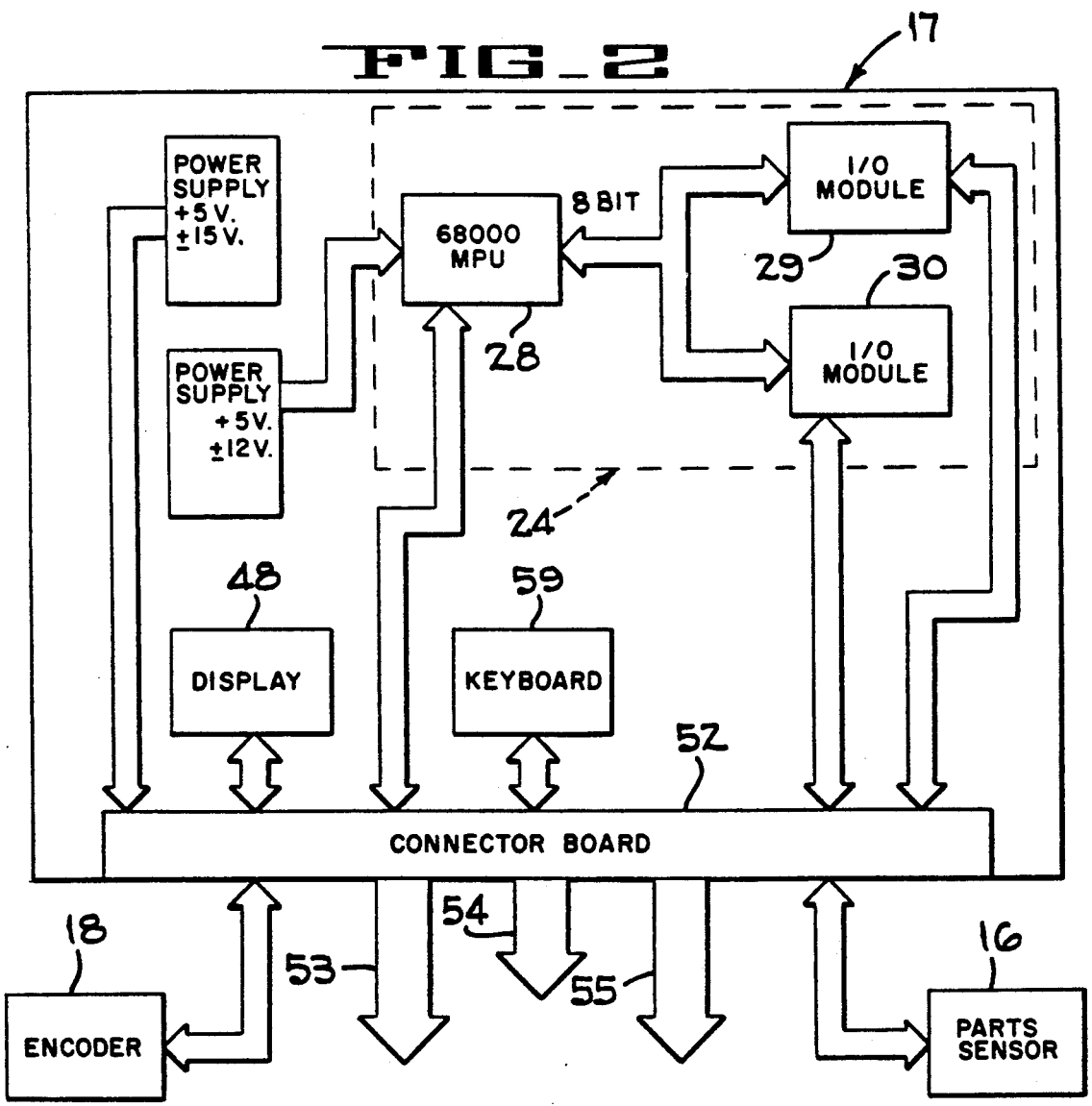
FIG_2

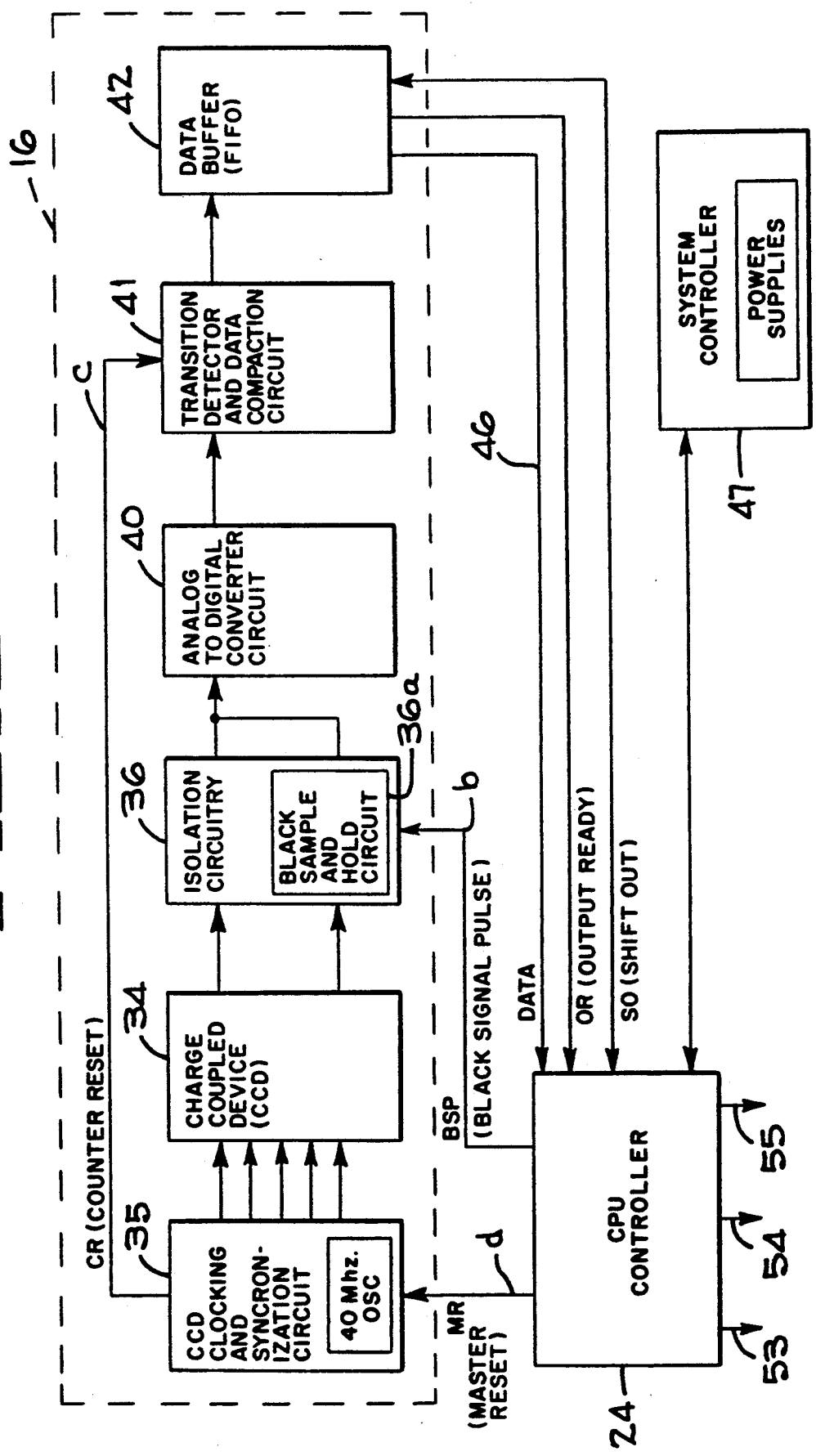

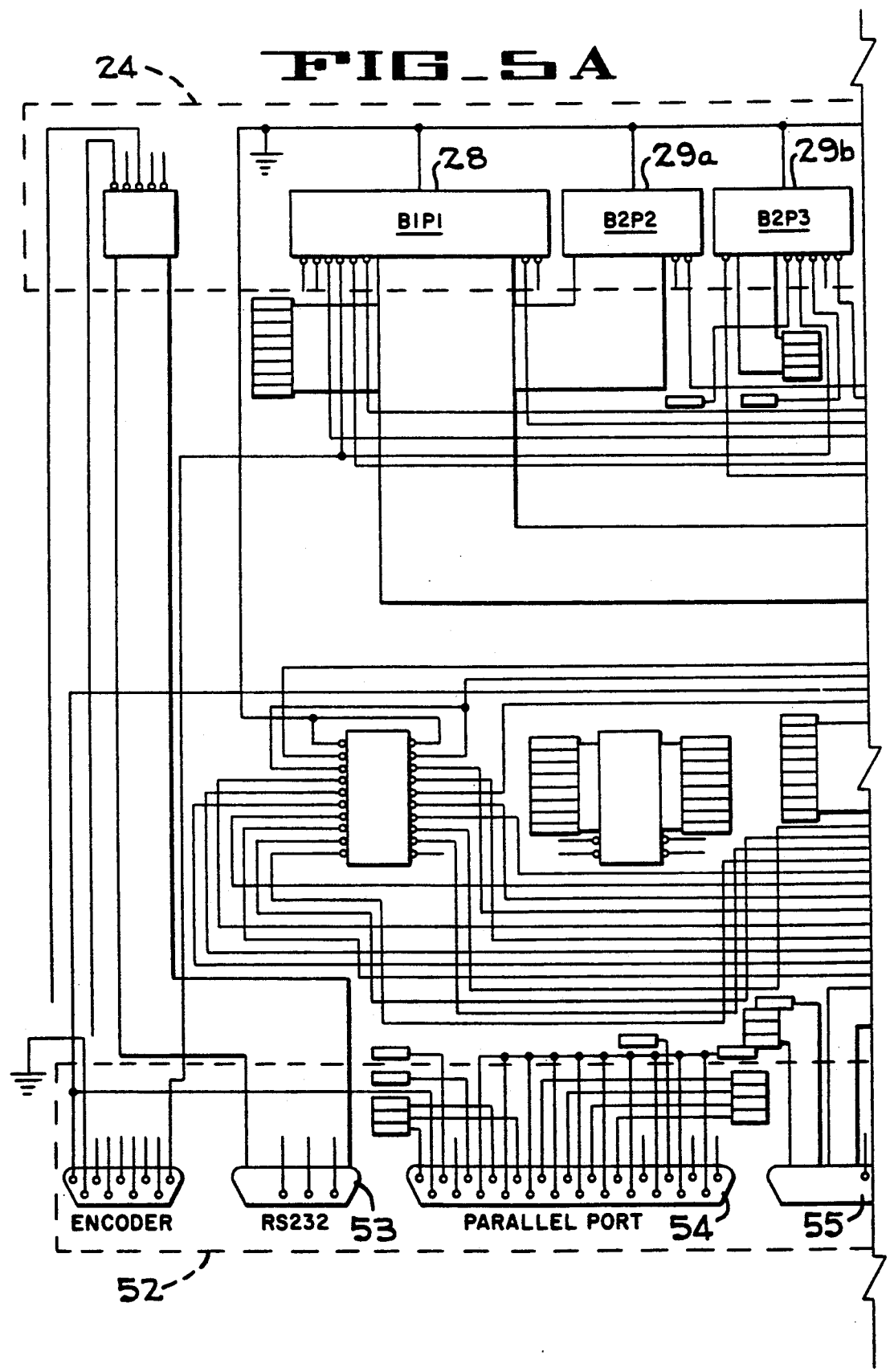

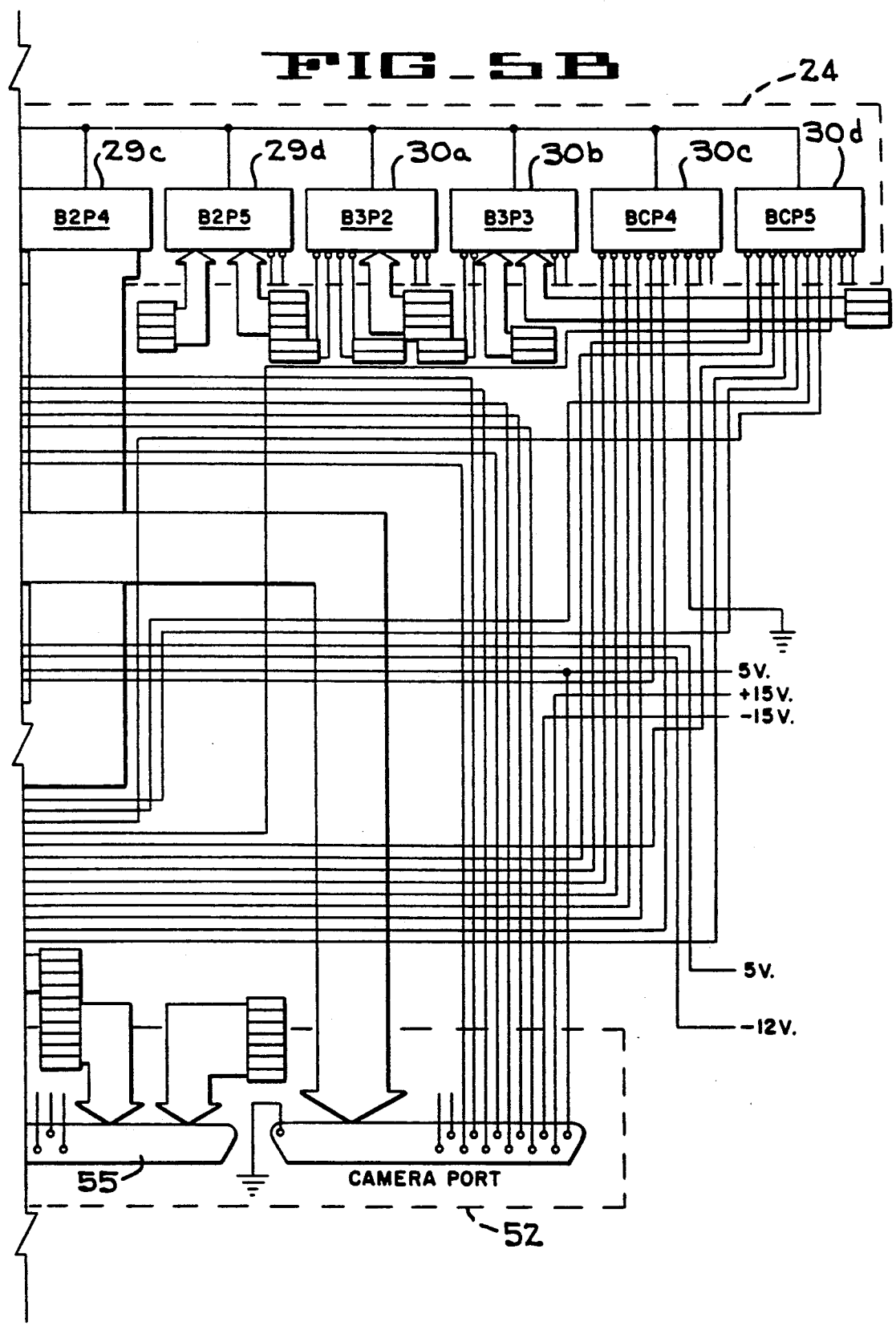

HIGH-RESOLUTION VISION SYSTEM FOR PART INSPECTION

BACKGROUND OF THE INVENTION

The present invention pertains to a system for the inspection of parts, and more particularly, to a vision system having a high resolution for a detailed inspection and/or orientation of parts.

Vision systems are widely used to view a part being moved past an inspection station and compare the part with a standard part to determine if the inspected part is within acceptable tolerances. Vision systems are also used to inspect a part and determine if the part should be rotated about an axis in order for the part to be placed into the proper orientation for connection to another part. Currently available inspection and/or orientation systems are relatively expensive and many are designed for use with a specific application.

SUMMARY OF THE INVENTION

The present invention is a relatively inexpensive high-resolution vision system which is useful in a variety of applications. A camera sensor having a visual resolution of 0.0025 inches in both the X axis and in the Y axis is used to scan a standard part. The size, shape and desired orientation of the standard part is placed in a storage device and these values are compared with values of size, shape and orientation of a part being inspected. An output signal indicates that the tested part is within acceptable tolerances or that it is outside these tolerances. Output signals can also be used to rotate or otherwise orient the tested part for connection to other parts. A microprocessor controller operates at a sample rate which is several times as high as the inspection sample rate of a part, so a multiple number of image edges of the tested part can be inspected.

BRIEF DESCRIPTION OF THE DRAWINGS

FIG. 1 illustrates a parts feeder with which the present invention can be used.

FIG. 2 is a block diagram of a vision system of the present invention.

FIG. 3 is a detailed block diagram of a potion of the vision system of FIG. 2.

FIG. 4 illustrates some of the electronic signals used in FIG. 3.

FIGS. 5A, 5B comprise a circuit drawing of the vision system shown in FIG. 2.

DESCRIPTION OF THE PREFERRED EMBODIMENT

A vision system of the present invention is used to inspect and/or orient parts which can be moved past an inspection station by a parts feeder 10 (FIG. 1). Feeder 10 singulates a plurality of parts 11 which are moved past a light source 12 and a geometric parts sensor 16. Parts sensor 16 senses the geometry of each part and provides signals to a vision controller and interface 17. A position sensor 18 senses the position of each part 11 as it approaches a part diverter 22. Diverter 22 can be used to reorient parts or to move parts into an output trough 23.

Interface 17 (FIGS. 2, 3, 5A, 5B) includes a CPU controller 24 having a microprocessor 28 and a plurality of input/output modules 29, 30. One CPU controller which can be used is the Model 68000 made by Motorola Corporation, Phoenix, Arizona. Parts sensor 16 includes a charge coupled device (CCD) 34 (FIG. 3) having an array for recording an image of a part being sensed. CCD 34 includes a one inch size linear array of 2048 pixels for recording an image of a part being sensed. A clocking and synchronizing circuit 35 provides a clock signal at a frequency of 10 MHz to scan CCD 34 and serially move the image information to an isolation and amplifying circuit 36. Waveform a of FIG. 4 illustrates the signals which are sent to circuit 36 from CCD 34. A black signal pulse (waveform b, FIG. 4) from controller 24 enables a black sample and hold circuit 36a to check the level of analog signals from CCD 34.

The analog signals from circuit 36 are converted to digital signals by an analog-to-digital (A to D) converter 40. A transition detector and data compaction circuit 41 compacts the digital data by recording the changes in levels of the serial digital data received by circuit 41. Because the number of changes in signal level may be only a fraction of the number (2048) of bits from each scan of the array in CCD 34, the amount of data stored in a data buffer 42 can be greatly reduced below the number 2048. Transition detector 41 includes a counter (not shown) which is reset by a pulse of waveform c (FIG. 4) to synchronize the counter with the arrival of a first pixel of information from a scan of CCD 34. When data buffer 42 contains information from a complete scan of CCD 34, buffer 42 sends an output ready signal (OR) to controller 24. When controller 24 is ready to receive the stored data, controller 24 sends a shift out (SO) signal to buffer 42 and data is transferred over a data line 46 to controller 24. Controller 24 synchronizes operations of sensor 16 using a master reset (MR) signal of waveform d (FIG. 4) to clocking circuit 35 when sufficient time has been allowed for data to be shifted serially from CCD 34. Controller 24 also sends control signals to a systems controller 47 which provides power to operate sensor 16 and controller 24.

When FIG. 5A is placed to the left of FIG. 5B the lines from the right side of FIG. 5A connect to the lines from the left side of FIG. 5B to form a detailed circuit of the vision system disclosed in FIG. 3.

When parts are to be inspected in feeder 10 (FIG. 1), a standard part is moved past parts sensor 16 and data from sensor 16 (FIG. 3) is stored in CPU controller 24. The parts to be tested are then moved past sensor 16 (FIG. 1) and data from each part is compared with data from the standard part to determine if the tested part is acceptable. It is not necessary to expand the compacted data from either the standard part or from the test part. When the standard part and the tested part are identical, the compacted data from the standard part and the compacted data from the tested part will be the same. When the tested part is only slightly different than the standard part, compacted data from the two parts will be only slightly different but within acceptable tolerances.

Output information from CPU controller 24 (FIGS. 2, 3, 5) is connected to a display unit 48 (FIG. 2) through a connector board 52 or to other output devices, such as printers, by ports 53–55. Instructions can be entered into controller 24 from a keyboard 59 (FIG. 2).

The present invention provides a high resolution, but inexpensive vision system for inspecting and/or orienting parts. A charge coupled device includes 2048 pixels which provides information concerning a plurality of part edges to identify each part passing a sensor.

Although the best mode contemplated for carrying out the present invention has been herein shown and described, it will be apparent that modification and variation may be made without departing from what is regarded to be the subject matter of the invention.

What is claimed is:

1. A high-resolution vision system for a detailed inspection of parts, said system comprising:

a camera sensor for sequentially observing a plurality of individual parts, wherein said camera comprises;

a charge coupled device;

a clock synchronization circuit coupled to said charge coupled device;

an analog to digital converter for converting an output of said charge coupled device into digital signals; and a transition detector and compaction circuit which compacts digital data from the digital signals by recording the changes in levels of said digital signals thus yielding compacted data;

a storage means for recording compacted data which indicates the changes of levels in a digital signal of a standard part to which similar parts can be compared; and comparison means for individually comparing the compacted data of each of a plurality of similar parts to the compacted data of said standard part without expanding the compacted data.

2. A vision system as defined in claim 1 including means for providing a visual resolution of 0.0025 inches of a part in both an X axis and in a Y axis.

3. A vision system as defined in claim 1 including a microprocessor controller, said controller operating at a sample rate which is a multiple of a part inspection rate to enable a multiple of image edges of each part to be inspected each time the part is inspected.

* * * * *